Dec. 11, 1962     B. BARÉNYI     3,068,039
RESILIENTLY PIVOTALLY MOUNTED BUMPERS FOR VEHICLES
Filed Sept. 23, 1957     3 Sheets-Sheet 1

INVENTOR
BÉLA BARÉNYI
BY *Dicke and Craig*
ATTORNEYS

Dec. 11, 1962 B. BARÉNYI 3,068,039
RESILIENTLY PIVOTALLY MOUNTED BUMPERS FOR VEHICLES
Filed Sept. 23, 1957 3 Sheets-Sheet 2
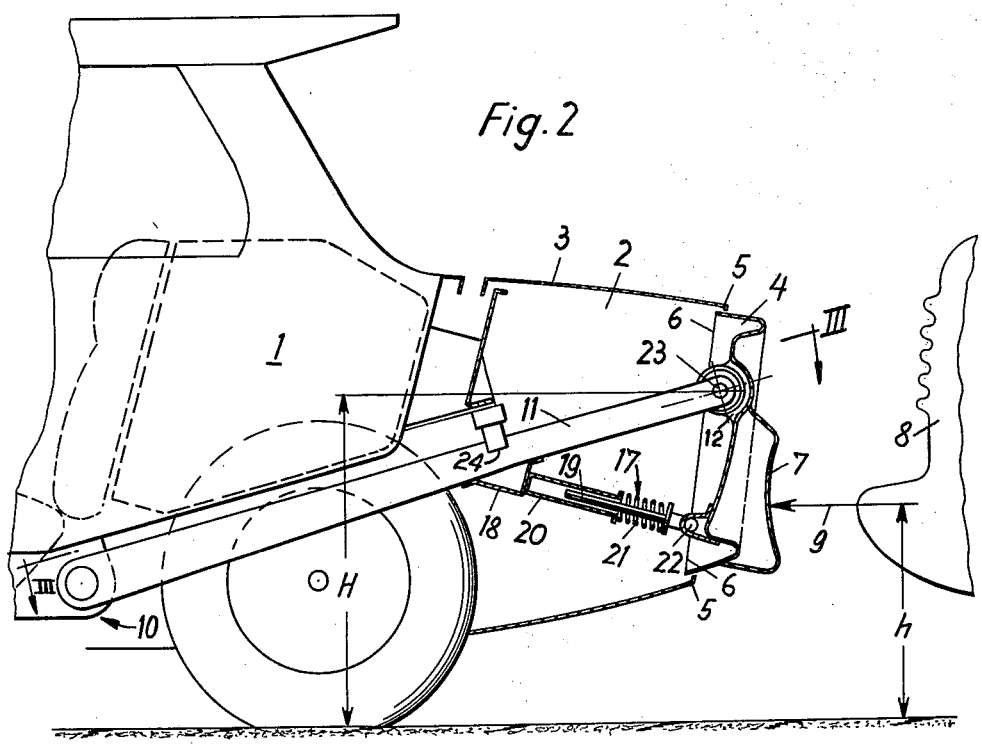
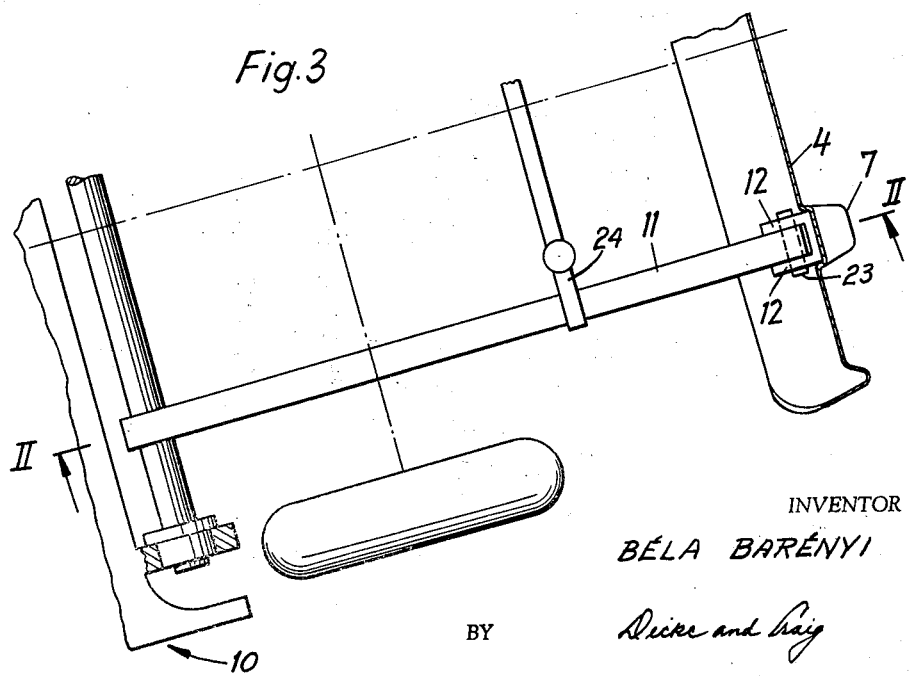
INVENTOR
BÉLA BARÉNYI
BY Dicke and Craig
ATTORNEYS Dec. 11, 1962 B. BARÉNYI 3,068,039
RESILIENTLY PIVOTALLY MOUNTED BUMPERS FOR VEHICLES
Filed Sept. 23, 1957 3 Sheets-Sheet 3

INVENTOR.
BÉLA BARÉNYI
BY Dicke and Craig
ATTORNEYS

3,068,039
RESILIENTLY PIVOTALLY MOUNTED BUMPER FOR VEHICLES
Béla Barényi, Stuttgart-Vaihingen, Germany, assignor to Daimler-Benz Aktiengesellschaft, Stuttgart-Unterturkheim, Germany
Filed Sept. 23, 1957, Ser. No. 685,669
Claims priority, application Germany Sept. 26, 1956
9 Claims. (Cl. 296—28)

The present invention relates to a collision protection for automobiles and similar vehicles and more particularly to a caplike element serving as an enlarged bumper for protecting one entire end of a car, and particularly the rear end, from being damaged in a collision, and for thus also preventing the metal covering as well as the frame of the car from being damaged.

Investigation of scores of car accidents has shown that the most vulnerable part of a car is its rear end and that very frequently, especially due to careless driving when parking and backing, the rear end of a car is crushed. The usual bumpers, partly because they are insufficiently resilient, cannot prevent such damage and are either rammed into the sheet metal covering or transmit the impact directly to the car frame so that the latter or parts thereof or other parts attached thereto will be damaged. Such bumpers are also usually inadequate because whatever protection they may afford will be attainable only if the object striking the car hits directly upon the bumper. Frequently, however, a car may be struck by, or strike against, the bumper of another car or any other object which is at a higher level than its own rear bumper with the result that the rear end of the car above the bumper will be damaged or, at best, the striking object, for example, the bumper of another car, will slide over the bumper and interlock with it.

It is the principal object of the present invention to provide an efficient collision protection for automobiles, and especially for the rear end thereof, which overcomes the various disadvantages of the usual bumpers, guard rails, or the like.

A feature of the invention for attaining this object consists in providing the rear end of a car with a resilient caplike member which covers the rear end of the car either substantially or entirely.

Another feature of the invention consists in mounting the caplike member on a part of the frame of the car so as to be resiliently pivotable about an axis which is disposed at a considerably higher level than that of a normal pumper of another car striking this car.

A further object of the invention is to provide a new car design in which the caplike member forms the rear end of the car and in which such caplike member forms an element separate from the sheet-metal covering of the car and is resiliently pivotable relative to such covering when engaged by another object so that at such time the caplike member will yield rotatively within the rear end of the sheet metal covering.

A preferred feature of the invention for attaining the last-mentioned object consists in designing the sheet metal covering of the car so as to have a rear open end which is then closed by the caplike cover which fits into this open end and is pivotably mounted relative thereto so as to yield in a rotative direction in the event of collision impact thereon.

Another object of the present invention is to provide a car frame which may either form an integral part of the main frame, and which is especially adapted to support the caplike rear end member and to act as a bearing element on which the caplike member is pivotable against the action of suitable resilient means.

Another object of the invention is to provide the caplike member with supplementary resilient bracing means at a level lower than that of the pivotal axis of such member.

A further object of the invention is to provide at least one of these bracing means so as to be rupturable when the caplike member is struck by an excessive force and thereby to prevent other parts of the car from being damaged.

Another object of the invention is to provide the caplike member with suitable reinforcing means extending over a substantial part of the member and especially over those parts thereof which are most liable to be struck.

A preferred feature of the invention for attaining the above-mentioned objects consists in also utilizing these reinforcing means for mounting the caplike member on the longitudinal frame members of the car.

Another feature of the invention consists in mounting the caplike member so as to be resiliently maintained in its normal position by being pivotable against the action of a torsion spring which extends coaxially to the pivotable axis of the caplike member or by being pivotable about a noncylindrical shaft with suitable resilient means such as rubber interposed between such shaft and the bearing portion of the caplike member.

A preferred feature of a modification of the invention consists in pivotably mounting the caplike member about an axis which is disposed at a level higher than the usually expected level of a striking force, and in supporting the lower end of the caplike member on a portion of the car frame by interposing suitable resilient means such as coil springs or hydraulic or pneumatic cylinders and pistons. If desired, the caplike member may in this event be provided at its pivotal axis with resilient means as above described or such means may be omitted at that point.

The present invention lends itself especially to a sectional type of automobile construction in which the car is composed of a plurality of separate units, for example, a front, central, and rear unit, which after being individually completed are secured to each other.

Further objects, features, and advantages of the present invention will be apparent from the following detailed description thereof, particularly when read with reference to the accompanying diagrammatic drawings, in which:

FIG. 2 illustrates a cross section similar to that shown in FIG. 1 of a modification of the invention wherein such section is taken along line II—II of FIG. 3;

FIG. 3 illustrates a cross section taken along line III—III of FIGURE 2;

Although in the attached drawings, the present invention as illustrated as being applied to an automobile which is made in the form of several separate units which, after being individually completed, are secured to each other, it will be obvious to any person familiar with the art that the invention is also applicable to the normal types of automobile construction.

Figure 1:
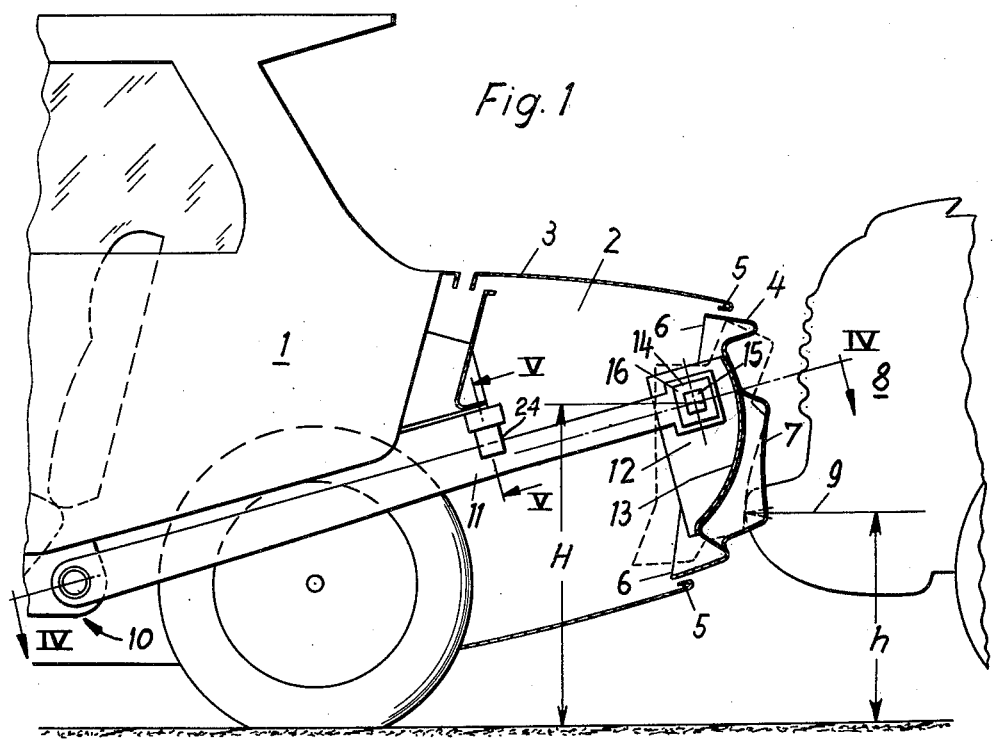
FIG. 1 illustrates a longitudinal cross section of the rear end section of an automobile according to the invention.
Figure 4:
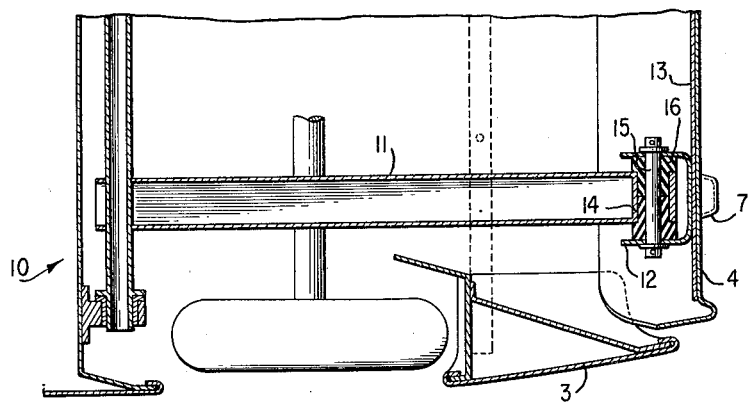
FIGURE 4 illustrates a cross-section taken along line IV—IV of FIGURE 1.
Figure 6:
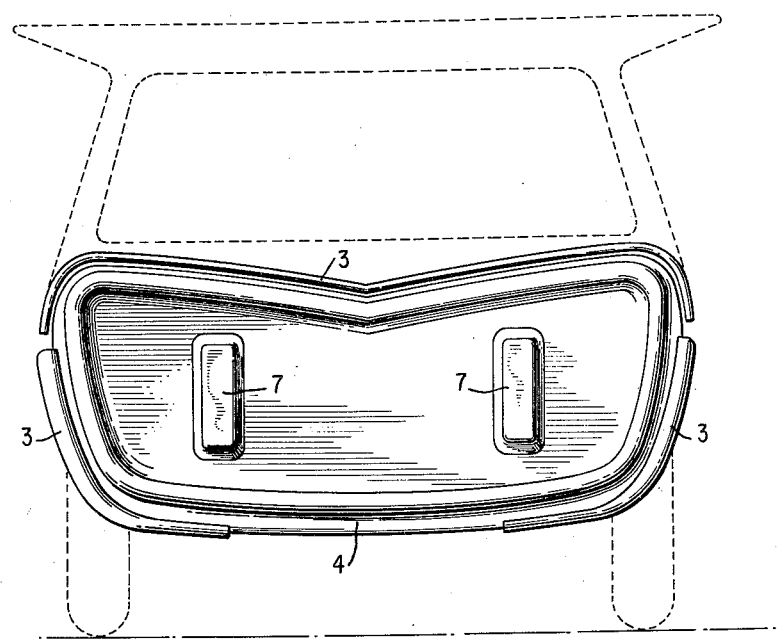
FIGURE 6 illustrates a rear view of the cap member with the vehicle outline being shown schematically.
Figure 5:
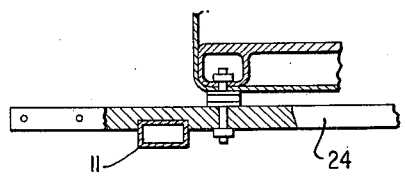
FIGURE 5 illustrates a partial sectional view substantially along line V—V of FIGURE 1 showing the connections between the auxiliary frame, the cross beam, and the vehicle superstructure.

Referring first particularly to FIG. 1, the central section 1 of an automobile has a rear section 2 secured thereto, preferably in a manner so as to be removable therefrom. This rear section 2 consists essentially of the sheet metal covering 3 and a separate rear end cap or bumper member 4. Covering 3 is open at its rear end and the rear edge 5 is preferably bent over inwardly. The cap member 4 is of slightly smaller outer dimensions than those of edge 5 and its front edge 6 extends for a short distance into the open rear end of section 2 and is pivotably mounted relative thereto. At two or three points along the width of cap member 4, the same is provided with substantially vertically disposed projecting portions 7 which may either form separate elements which are secured to member 4 or may be molded integrally with cap member 4. These projecting portions 7 extend from a level similar to or even lower than the level of an average automobile bumper, designated by $h$ in FIGURES 1 and 2, to a level $H$ above the ground which is much higher than that of the usual bumpers so that if struck by a very low or very high bumper of another car or truck 8, the bumpers of both cars will engage with each other in a horizontal direction, for example, as shown by arrow 9, and the two bumpers will neither interlock nor will the bumper of car 8 be able to hit the rear end of the first car at a point below or above the projections 7. The longitudinal frame members 10 of the main frame of the car may either be provided with rearward extensions or with separate auxiliary car frame members 11 which are secured to the main frame and terminate at a level considerably above that of a usual car bumper. A cross beam 24 extends between the auxiliary frame members 11 and is in effect supported thereon, see FIGURES 1 and 5. The cross beam 24 may be connected to the members 11 in a conventional manner, such as by welding. As just described, the frame of the motor car thus comprises a main frame and auxiliary frame members 11. In the embodiments of the invention shown in the figures of the drawing, the members 11 are shown as pivotally secured to the longitudinal frame members 10 of the main frame; however, within the scope of the invention other modes of securement may be advantageously employed, if desired. Cap member 4 is pivotally mounted on frame members 11, for example, as indicated in FIG. 3, by being provided with a pair of forward extensions or flanges 12 surrounding the rear end of each member 11. As indicated in FIG. 1, cap member 4 may also be reinforced by a member 13 which engages with and may be secured to the front surface of the main body portion of member 4 and may, if desired, be integral with or secured to flanges 12. The rear ends of frame members 11, FIGURE 1 each have a large square opening 14 in which a square shaft 15 of smaller outer size is disposed which is secured to flanges 12. The intermediate opening between shaft 15 and the inner walls of opening 14 is filled with a rubber packing 16. FIGURE 4 illustrates the position of packing 16 within the opening 14 in greater detail. Thus, if a force is exerted upon cap member 4 or projections 7 thereof at the level $h$ above the ground and in the direction shown by arrow 9, flanges 12 will turn on shaft 15 at the much higher level $H$ against the resilient pressure of packing 16, cap member 4 will then pivot against such resilient pressure about the axis of shaft 15, and its lower part will rotate within the open rear end of section 2, as indicated in FIG. 1 in dotted lines, while when such force is released, cap member 4 will again return to its original position as shown in full lines.

The modification of the invention as illustrated in FIG. 2, differs from the embodiment shown in FIG. 1 primarily by the fact that the lower end of cap member 4 is provided with additional resilient supporting elements 17 whereby cap member 4 is braced at least at two different points against suitable abutments 18 on frame members 11, preferably within a vertical plane in line with projections 7. The two parts 19 and 20 of each of these supporting elements 17 may be telescopically slidable within each other and be normally held in an extended relation to each other by one or more coil springs 21, or one of the two parts 19 and 20 may be in the form of a piston which is slidable within the other part which is in the form of a cylinder against a pneumatic or hydraulic resistance. Member 19 is preferably pivotably connected to cap member 4 by means of a pin 22.

Although the pivotal mounting of cap member 4, according to FIG. 2 may also be noncircular and be provided with a rubber packing, for example, as illustrated in FIG. 1, by element 16, or be acted upon by torsion springs as previously described, in which event the resilient bracing element 17 only serves as an additional protection against strong impacts upon cap member 4, the main opposing action against the pivotal movement of cap member 4 is preferably attained by bracing element 17. Shafts 23, which link the members 11 to the cap 4 and which are similar in function to shafts 15 of FIGURE 1, as well as the bearings in flanges 12 may in that case be round, although a resilient packing, not shown in FIG. 2, is preferably interposed between the two parts.

If the resiliency of cap member 4 is to be attained either solely or supplementarily by bracing element 17, it may also be advisable to design at least one of the bracing parts, that is, abutment 18, part 19 or 20, or pivot pin 22, so as to be more easily rupturable than the other parts of the entire structure.

The separate rear end cap member according to the invention by being resiliently pivotable about an axis which is disposed at a much higher level than the point of impact of a usual car bumper not only affords a much greater protection to the rear end of the car but to the frame and body of the car as well as to the occupants of of the car. Furthermore, due to the fact that the cap member forms an element separate from the sheet metal covering of the car itself and of the rear part thereof, even an impact of a very great external compressive force will not damage these sheet metal parts. If such impact should be severe enough to damage cap member 4 or its supporting parts, it will be a relatively easy matter to remove and repair such damaged part or replace it by a new part. In fact, as indicated in FIG. 1, the bumper of another car may penetrate rather deeply or even entirely into the rear end of the first car without danger that the sheet metal covering of the latter will be damaged.

In all embodiments of the invention, the cap member 4 is rotatable or pivotable about an axis passing through the outer ends of the auxiliary frame members 11. Thus in the event of a rear-end collision with a car such as car 8, upon impact of the bumper of such a car upon one of the vertically disposed projections 7 for example, the cap member 4 will be rotated in a clockwise direction as viewed in FIGURES 1 and 2. The resilient devices provided for the purpose oppose the clockwise rotational movement and upon cessation of collision pressure cause a rotational movement of the cap 4 in a counter-clockwise direction back to its original position.

In the accompanying drawings, cap member 4 has been illustrated as being pivotably movable within the open rear end 5 of the car; however, it may also be designed so as to overlap the rear end 5 at the outside thereof.

Although the invention is primarily intended to serve as an effective protection of the rear end of a car, it may in principle also be applied to the front end thereof, and it will only require means analogous to those described and illustrated and easily perceived by any person familiar with this art to adapt this invention to protect both ends of a car.

Although my invention has been illustrated and described with reference to the preferred embodiments thereof, I wish to have it understood that it is in no way limited to the details of such embodiments, but is capable of numerous modifications within the scope of the appended claims.

The term "large opening" as utilized in the specification and in the appended claims is to be construed relative to the size of the section or end of the vehicle shell in which the opening is found.

Having thus fully disclosed my invention, what I claim is:

1. A motor car having a frame, an outer covering having a plurality of sections substantially enclosing said frame and supported thereby, said covering having a large opening at one section thereof, a bumper member essentially forming a continuation of said outer covering mounted essentially within said car to substantially close said opening, and means within said section for mounting said member within said car, said means including resilient means for resiliently resisting a movement of said member caused by an external force.

2. A motor car having a frame, an outer body covering having a plurality of sections substantially enclosing said frame means supporting said covering on said frame, said covering having a large opening at one section thereof, a caplike member essentially forming a continuation of said outer covering mounted within said section and substantially closing said opening, and means for pivotally mounting said member essentially within said section, whereby said member will pivot upon being subjected to impact.

3. A motor car having a frame, an outer covering having at least one end and substantially enclosing said frame, means mounting said covering on said frame, said covering having a large opening at one end thereof, a caplike member essentially forming a continuation of said outer covering mounted essentially within said car to substantially close said opening, means for pivotably mounting said member to said frame about an axis in an upper region within said car, and resilient connecting means interposed between said member and said frame for normally maintaining said member in a fixed position within said opening, whereby when said member is pushed adjacent a lower part thereof by an external force, said member will pivot about said axis against the action of said resilient means.

4. A motor car as defined in claim 3, wherein said pivotal mounting means comprise at least one shaft part of noncircular cross section and a bearing part having inner walls of noncircular cross section disposed around said shaft part but spaced therefrom, one of said parts being secured to said frame and the other part being secured to said caplike member, said resilient connecting means comprising a packing of resilient material interposed between said two parts and adapted resiliently to resist a pivotal movement of said two parts relative to each other.

5. A motor car as defined in claim 3, wherein said pivotal mounting means comprise at least one shaft part, and a bearing part rotatably mounted on said shaft part, one of said parts being secured to said frame and the other part being secured to said caplike member, said resilient connecting means comprising at least one torsion spring interconnecting said two parts and adapted resiliently to resist a pivotal movement of said two parts relative to each other.

6. A motor car as defined in claim 3, wherein said resilient connecting means are interposed between and connected to a part of said frame and said caplike member at a level substantially lower than the level of said axis.

7. A motor car as defined in claim 6, wherein said resilient connecting means comprise at least one spring.

8. A motor car as defined in claim 6, wherein said resilient connecting means comprise a cylinder member, a piston member slidable within said cylinder member, and means within said cylinder member for resiliently resisting the sliding movement of said piston member into said cylinder member, one of said cylinder and piston members being connected to said frame part and the other member to said caplike member.

9. A motor car as defined in claim 6, wherein at least one part of said resilient connecting means is designed so as to rupture when an excessive pressure is exerted upon said caplike member.

References Cited in the file of this patent

UNITED STATES PATENTS

| | | |
|---|---|---|
| 1,529,668 | Perlman | Mar. 17, 1925 |
| 1,800,142 | Heagney | Apr. 7, 1931 |
| 2,011,051 | Hallquist | Aug. 13, 1935 |
| 2,028,945 | Morrison | Jan. 28, 1936 |
| 2,036,560 | Backus | Apr. 7, 1936 |
| 2,062,328 | Morrison | Dec. 1, 1936 |
| 2,074,469 | Haynes | Mar. 23, 1937 |
| 2,193,229 | Exner | Mar. 12, 1940 |
| 2,194,459 | Frank | Mar. 26, 1940 |
| 2,247,664 | Osman | July 1, 1941 |
| 2,553,320 | Huff | May 15, 1951 |
| 2,578,068 | Johnson | Dec. 11, 1951 |
| 2,621,955 | Dykstra | Dec. 16, 1952 |
| 2,759,755 | Johnson | Aug. 21, 1956 |
| 2,829,915 | Claveau | Apr. 1, 1958 |
| 2,953,409 | Barenyi | Sept. 20, 1960 |

FOREIGN PATENTS

| | | |
|---|---|---|
| 170,857 | Canada | July 18, 1916 |
| 177,720 | Canada | June 19, 1917 |